United States Patent
Manuguri et al.

(10) Patent No.: US 10,277,482 B2
(45) Date of Patent: *Apr. 30, 2019

(54) DISTRIBUTED DEEP PACKET INSPECTION

(71) Applicant: VMware, Inc., Palo Alto, CA (US)

(72) Inventors: Subrahmanyam Manuguri, San Jose, CA (US); Jayant Jain, Cupertino, CA (US); Anirban Sengupta, Saratoga, CA (US)

(73) Assignee: VMWare, Inc., Palo Alto ( * ) Notice: Subject to any disclaimer, the term of this patent is extended or adjusted under 35 U.S.C. 154(b) by 0 days.

This patent is subject to a terminal disclaimer.

(21) Appl. No.: 14/945,334

(22) Filed: Nov. 18, 2015

(65) Prior Publication Data

US 2016/0072684 A1    Mar. 10, 2016

Related U.S. Application Data

(63) Continuation of application No. 13/764,341, filed on Feb. 11, 2013, now Pat. No. 9,225,647.

(51) Int. Cl.
| | |
|---|---|
| *H04L 12/26* | (2006.01) |
| *H04L 12/801* | (2013.01) |
| *H04L 29/06* | (2006.01) |
| *H04L 12/24* | (2006.01) |
| *H04L 12/813* | (2013.01) |
| *H04L 12/803* | (2013.01) |

(52) U.S. Cl.
CPC ............ *H04L 43/028* (2013.01); *H04L 41/12* (2013.01); *H04L 47/12* (2013.01); *H04L 47/20* (2013.01); *H04L 63/20* (2013.01); *H04L 47/125* (2013.01)

(58) Field of Classification Search
CPC ....... H04L 47/10; H04L 47/12; H04L 47/125; H04L 43/028; H04L 41/12
See application file for complete search history.

(56) References Cited

U.S. PATENT DOCUMENTS

| | | | | |
|---|---|---|---|---|
| 2006/0235995 | A1* | 10/2006 | Bhatia | H04L 12/4641 709/238 |
| 2009/0254990 | A1 | 10/2009 | McGee | |
| 2009/0262741 | A1 | 10/2009 | Jungck et al. | |
| 2010/0138543 | A1* | 6/2010 | Loman | G06F 17/30949 709/227 |
| 2013/0144906 | A1* | 6/2013 | Bhupalam | H04L 65/4084 707/771 |
| 2014/0198789 | A1* | 7/2014 | Kim | H04L 69/04 370/392 |

OTHER PUBLICATIONS

Dr. Milton Mueller, DPI Technology from the standpoint of Internet governance studies: An introduction, Oct. 21, 2011, 11 pages.

\* cited by examiner

*Primary Examiner* — Feben Haile

(57) ABSTRACT

Exemplary methods, apparatuses, and systems receive a copy of or make a copy of one or more packets of a flow of packets between a source and a destination. While or after the one or more packets are forwarded to the destination, the content of the packets is compared to a policy to determine if the flow of packets triggers a policy response. A map of devices within a datacenter cluster of devices is maintained and used to select one or more available devices when packet inspection is distributed.

20 Claims, 5 Drawing Sheets

DISTRIBUTED DEEP PACKET INSPECTION

CROSS-REFERENCE TO RELATED APPLICATIONS

This application is a continuation of U.S. patent application Ser. No. 13/764,341, filed Feb. 11, 2013, which is hereby incorporated by reference.

FIELD OF THE INVENTION

The various embodiments described herein relate to inspecting packets being transmitted from or received by a device within a network. In particular, embodiments relate to deep packet inspection distributed across a cluster of host devices in a virtual datacenter.

BACKGROUND OF THE INVENTION

Deep packet inspection (DPI) is a network packet filtering approach that examines the data section and headers of packets transmitted to or from a network device. DPI is used for advanced network management, such as data mining, eavesdropping, censorship, compliance, and detection of viruses, spam, intrusions, or defined criteria to decide whether to allow the packet to pass, route the packet to a different destination, or otherwise save or take note of the packet for statistical information. Physical DPI equipment often sits on the edge of a network and performs packet inspection before packets are transmitted outside of the network or permitted within the network. Inspecting data packets at the line rate (e.g., tens of gigabytes per second) to avoid packet transmission latency is a daunting challenge that includes custom hardware and, therefore, a large capital investment. While some cloud service providers offer DPI solutions, the round trip delays of remote packet inspection results in undesirable delays in network traffic.

SUMMARY OF THE INVENTION

Exemplary methods, apparatuses, and systems receive a copy of or make copy of one or more packets flowing between a source and a destination. While or after the one or more packets are forwarded to the destination, the content of one or more of the copied packets is compared to a policy to determine if the flow of packets triggers a policy response. Exemplary policy responses include resetting the flow of packets or diverting the flow of packets. In one embodiment, a map of devices within a datacenter cluster of devices is maintained and used to select one or more available devices when packet inspection is distributed.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein perform deep packet inspection (DPI). In particular, embodiments receive a copy of or make a copy of one or more packets of a packet flow between a source and a destination. While or after the one or more packets are forwarded to the destination, the content of the one or more copied packets is compared to a policy to determine if the packet flow triggers a policy response. Performing the DPI while or after the packets are forwarded to the destination reduces at least some packet transmission latency (e.g., latency that would occur if transmission was delayed until DPI was performed). When a policy response is triggered, the response is carried out on an incomplete packet flow. The amount of packets of the packet flow that are forwarded to the destination prior to the policy response is often benign.

Embodiments described herein perform distributed DPI. In maintaining a map of available devices within a datacenter cluster, virtualized datacenter cluster, or other cluster of devices, embodiments take advantage of underutilized computational resources to inspect packets and trigger policy responses.

Figure 1:
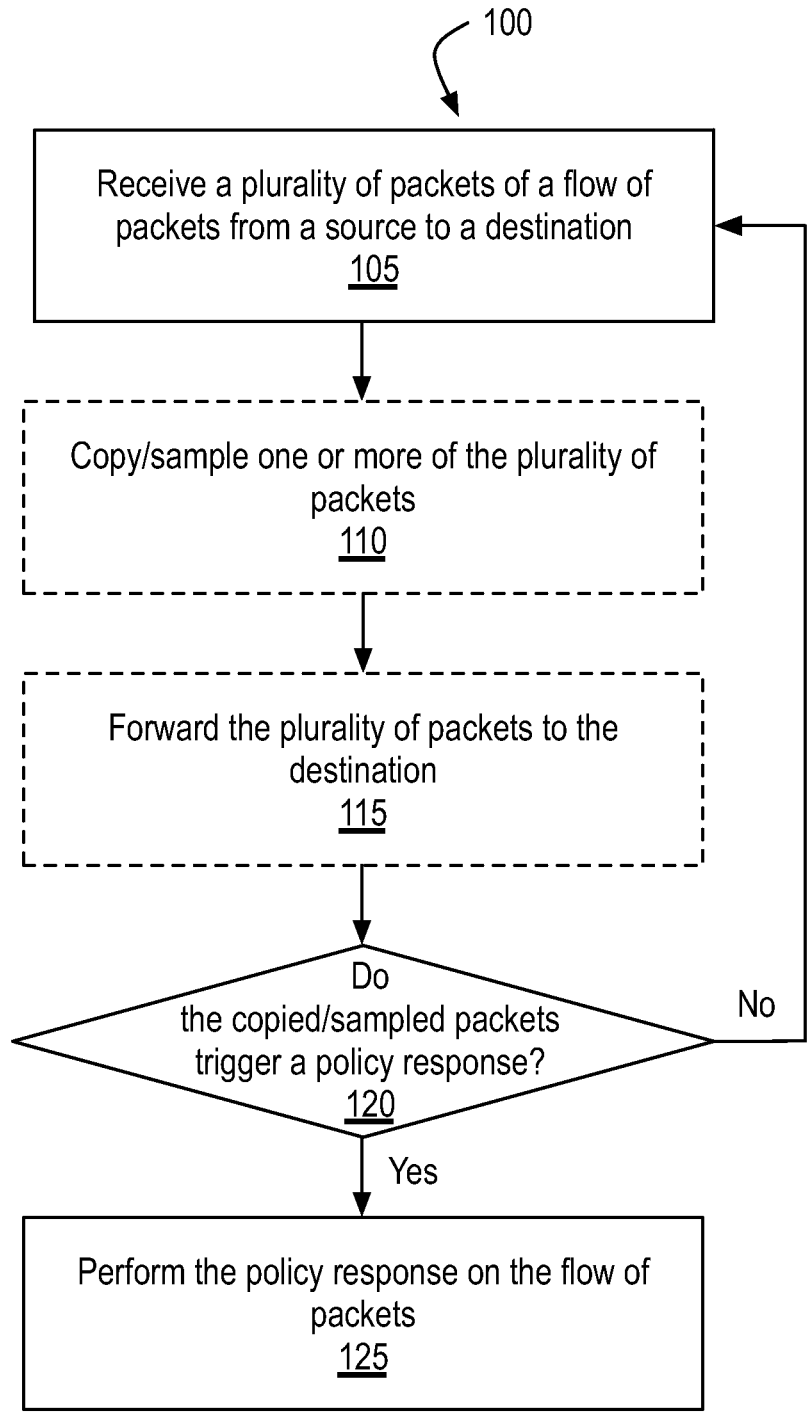
FIG. 1 is a flow chart illustrating an exemplary method of deep packet inspection or distributed deep packet inspection.

FIG. 1 is a flow chart illustrating an exemplary method 100 of deep packet inspection. At block 105, an embodiment receives one or more packets of a flow of packets from a source to a destination. In one embodiment, the received packets are complete or partial copies of the packet flow. For example, the use of port mirroring on a switch provides a copy of network packets flowing between a source and a destination. Alternatively, the actual packet flow is received.

As used herein, a flow of packets or packet flow refers to a sequence of packets from a source computer, which may be physical device or a virtual machine, to a destination computer, which may be a physical device, a virtual machine, a multicast group, or a broadcast domain. The source and destination computers may be within the same host device, separate devices within the same network, or separate devices within disparate networks. For example, as will be discussed in more detail below, a kernel layer module may receive packets sent to/from a virtual machine.

At block 110, the embodiment optionally copies one or more of the received packet(s). For example, if the received packets are already copied from a packet flow, the embodiment may not make an additional copy. Alternatively, when the actual packet flow is received, a partial or complete copy of the received packets may be made.

In one embodiment, the plurality of packets may be sampled at one or more configurable rates. In one embodiment, the packets are copied according to a stateful inspection by tracking one or more of Internet Protocol (IP) addresses, port numbers, packet sequence numbers, etc. associated with packets. As such, a consecutive sequence of 10, 50, 100, and/or another number of packets is copied.

In one embodiment, overlapping portions of the packet stream are copied. For example, consecutive sequences of the first 10 packets, first 50 packets, and first 100 packets of a packet stream may be copied to provide varying levels of context for the data within the packet flow. In one embodiment, entire packets are copied. Alternatively, only a portion of each the packets is copied.

At block 115, an embodiment optionally forwards a copy of the one or more received packets to the destination computer. For example, when the received one or more packets are copies of the packet flow, the actual packet flow may have already been forwarded to the destination (e.g., by the switch that provided port mirroring). Alternatively, the actual packet flow is received and either the original copy or new copy of the one or more packets is forwarded. While or after the one or more received packets are forwarded to the destination computer, at block 120, an embodiment determines if the one or more packets trigger a policy response. In an alternate embodiment, packets are stored and not forwarded until the determination if the copied packet(s) trigger a policy response. Additional packets received prior to making the determination may be dropped while waiting for the DPI verdict.

If a policy response is not triggered, DPI continues at block 105. If a policy response is triggered, at block 125, an embodiment performs said policy response with respect to the flow of packets. In one embodiment, the policy response includes taking an action that has an impact on the packet flow, such as resetting the packet flow, dropping packets from the packet flow, redirecting the packet flow, etc. For example, inspection of the packets may reveal that the packets include data from a prohibited uniform resource locator (URL) and the packet stream is reset/dropped as a part of a triggered policy response. While the content of the packet stream may have started to reach the destination computer (e.g., begun loading a webpage associated with the prohibited URL), once the policy response is triggered, additional packets are dropped and a reset packet is sent to the destination to terminate the stream (e.g., the loading webpage will transition to an error message). An exemplary reset packet, according to the Transmission Control Protocol (TCP), is a packet that includes the reset (RST) flag set. The RST flag indicates to the receiving computer that the computer should immediately stop using the TCP connection, the computer should not send any more packets using the connection's identifying numbers (e.g., ports), and discard any further packets it receives with headers indicating they belong to that connection.

As described above, one embodiment copies overlapping and differently sized portions of the packet stream, e.g., consecutive sequences of the first 10 packets, first 50 packets, and first 100 packets of a packet stream. In one embodiment, each sequence is inspected to determine if a policy response is triggered. If any inspection triggers a policy response of resetting the packet stream, the embodiment carries out the reset without waiting for a verdict from the inspection of the other copied portions of the packet stream. In one embodiment, different copied portions of the same packet stream trigger different responses, each of which is performed.

In one embodiment, the determination whether the copied packets trigger a policy response is performed by a device performing the method 100. Alternatively, the device performing the method 100 receives the verdict of the DPI performed by another device. For example, as will be described in further detail below, the task of performing the inspection may be delegated to one or more devices with computational bandwidth within a cluster of devices. As described below with reference to FIG. 4, the determination at block 120 optionally includes selecting a device to perform the inspection, transmitting the copied packets to the selected device, and receiving the result of the inspection from the selected device. Additionally, multiple devices may be selected. In the example above in which the first 10, 50, and 100 consecutive packets of a packet stream are separately copied, one selected device may inspect the first 10 consecutive packets while a different selected device inspects the first 50 consecutive packets, and yet another selected device inspects the first 100 consecutive packets.

Figure 2:
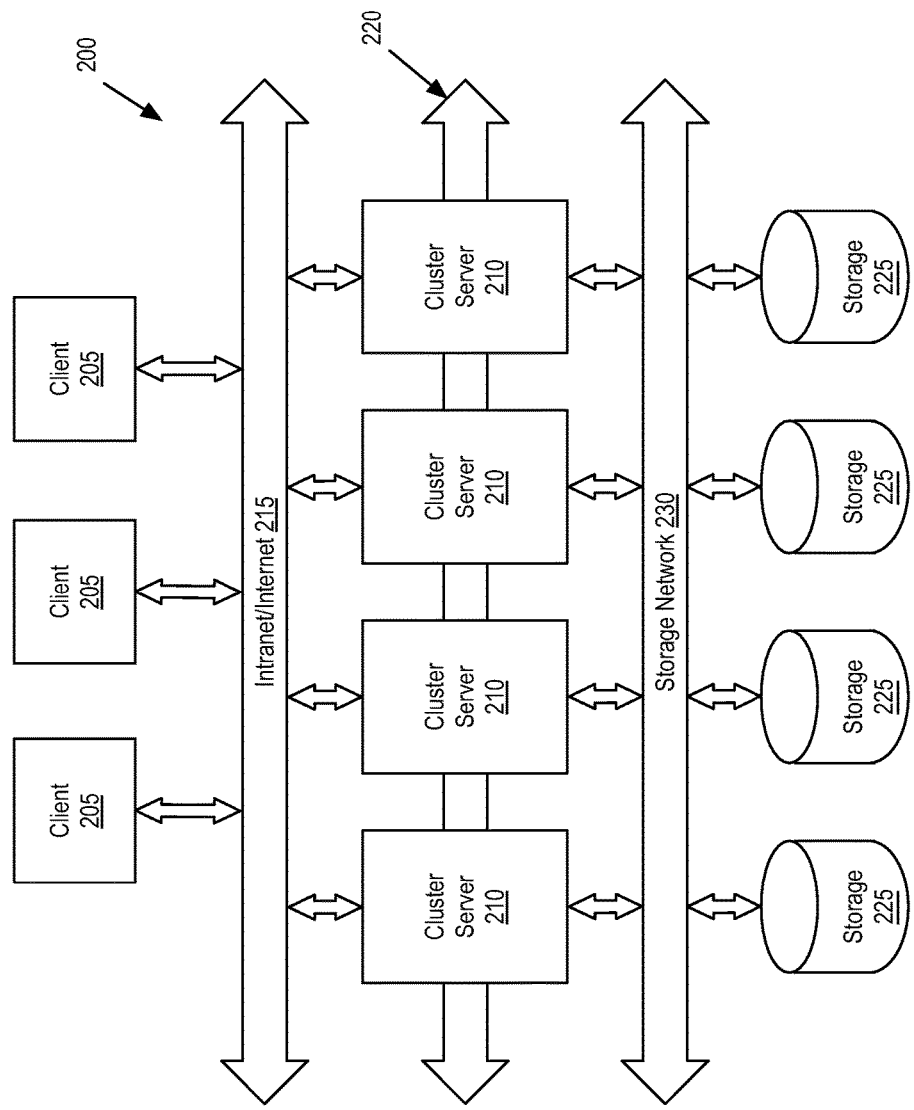
FIG. 2 illustrates, in block diagram form, an exemplary datacenter cluster for distributed deep packet inspection.

FIG. 2 illustrates, in block diagram form, an exemplary datacenter cluster 200 for distributed deep packet inspection. Clients 205 are coupled to the cluster servers 210 over a network 215, e.g., an intranet or the Internet. In one embodiment, the cluster servers are further coupled to one another over a fast local network 220, such as a Fibre Channel or other high-speed wired/optical network. Additionally, the cluster servers 210 are coupled to storage devices 225 (e.g., implementing a redundant array of independent disks) by way of a storage network 230. In an alternate embodiment, one or more of the networks 215, 220, and 230 is omitted. For example, the cluster server network 220 and storage network 230 may be combined. Embodiments described herein may also be implemented in other computer clusters and is not limited to a server/datacenter cluster 200.

As used herein, a datacenter cluster 200 refers to a group of independent servers 210 working together as a single system to provide high availability of services for clients 205. Each cluster server 210 may represent a physical device or a virtual machine within a physical device. For example, two of the illustrated cluster servers 210 may be separate virtual machines on a single host device. Additionally, two or more of the cluster of servers 210 may be presented as a single, cohesive unit/system to the clients 205 and provide load balancing and failover protection in servicing requests from the clients 205. The cluster of servers 210 receives requests from clients 205 to transmit data stored within the storage device(s) 225, receive data to be stored within the storage device(s) 225, or another network service. In receiving and transmitting data or requests for data, one or more of the clients 205 and cluster servers 210 may implement the method 100 of DPI. Furthermore, as will be described below, the cluster servers 210 may perform distributed DPI.

Figure 3:
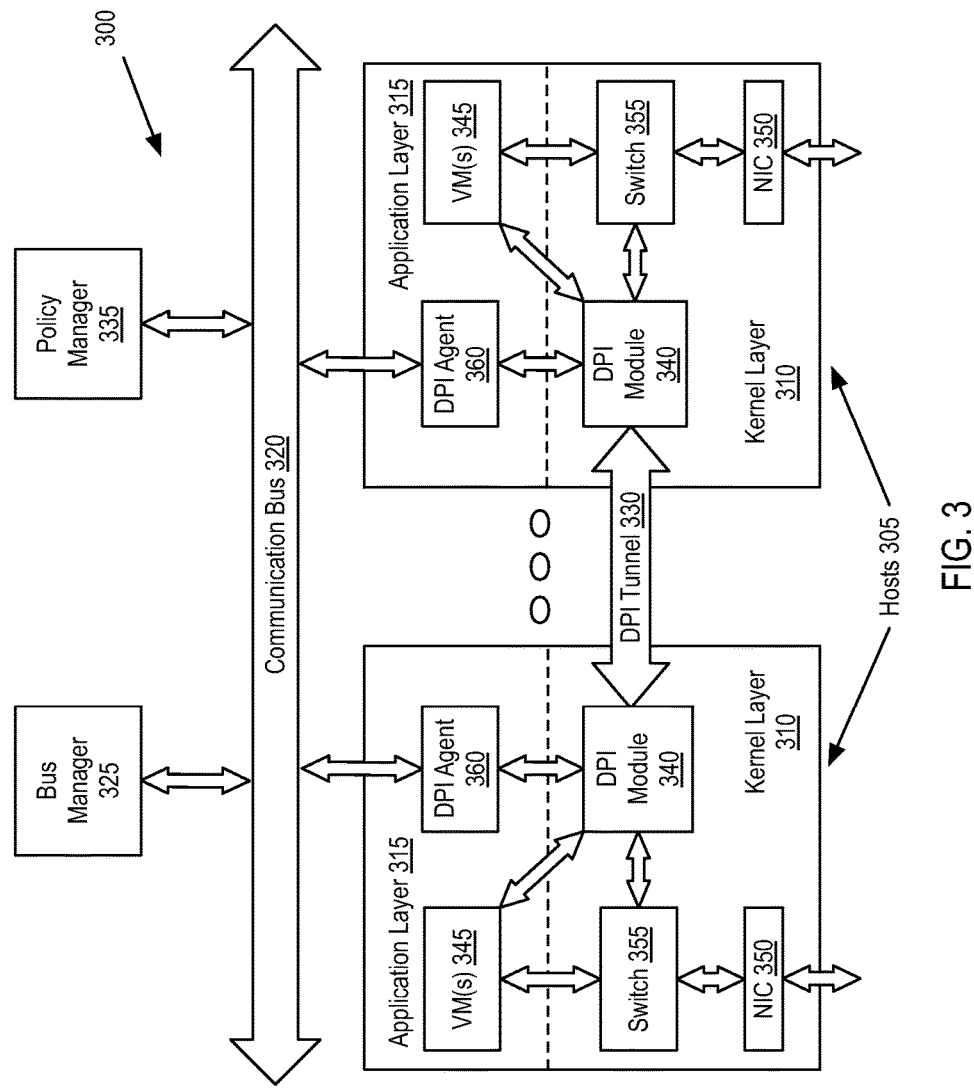
FIG. 3 illustrates, in block diagram form, host devices within a virtualized datacenter cluster to perform deep packet inspection.

FIG. 3 illustrates, in block diagram form, host devices 305 within a virtualized datacenter cluster 300 to perform deep packet inspection. In one embodiment, one or more cluster servers 210 and/or clients 205 described above are implemented as a virtual machine within a host device 305. As used herein, a virtual machine refers to a software implementation of a machine (e.g., a computer) that, in turn, executes programs like a physical machine. In one embodiment, a hypervisor or virtual machine manager operates at the kernel layer 310 of a host 305, interacting directly with the hardware, and enables the virtualization of machines in the application layer 315. In an alternate embodiment, the hypervisor/virtual machine manager runs within an operating system environment of host 305.

In one embodiment, the kernel layer includes a DPI module 340 to perform the packet inspection method 100 described herein. For example, the DPI module 340 is coupled to one or more virtual machines 345 and to a network interface controller (NIC) 350, e.g., directly or through a switch 355. In one embodiment the NIC 350 and the switch 355 are a virtual NIC 350 and a virtual switch 355 implemented within the same host 305. Alternatively, one or both of the NIC 350 and switch 355 are a physical device or is implemented within a separate device. Packets originating from a virtual machine 345 within the host 305 or in transit to a virtual machine 345 within the host 305 may be copied by the switch 355 or DPI module 340 and, in turn, result in the DPI module 340 triggering a policy response (e.g., by reassembling packets and/or otherwise determining that copied packets match a policy). In one embodiment, the switch 355 and/or virtual machines 345 may be tailored to selectively subject packets associated with particular virtual machines 345 to DPI. For example, if a host 305 includes two virtual machines 345, one virtual machine 345 may have packets subjected to DPI while packets corresponding to the other virtual machine bypass the DPI module 340 and are not subjected to DPI. Bypassing the DPI module 340 eliminates transmission latency associated with copying packets and enables an administrator to fine-tune a network to the specific needs of each virtual machine 345.

In a distributed DPI embodiment, the DPI module 340 cooperates with a DPI agent 360 in the application layer 315 to maintain a map of all hosts that are accessible within the cluster of devices and able to perform DPI. In an alternate embodiment, the DPI agent 360 is implemented within the kernel layer 310. The DPI agents 360 exchange computational resource availability data with one another over a communications bus 320. Exemplary availability data includes a heartbeat, processor load, queue depth, available memory, etc. In one embodiment, the communication bus is implemented using a messaging protocol. For example, a bus manager 325 may manage DPI agent registration and broker messaging between DPI agents 360 on the communication bus 320. The DPI module 340 receives the availability data from its corresponding DPI agent 360 and uses said availability data to maintain a map of all of the hosts and their updated availability to perform DPI.

In one embodiment, the DPI module 340 creates one or more point-to-point tunnels 330 with DPI modules 340 on other hosts that are available to participate in distributed DPI (e.g., clustered devices). For example, using the map of available hosts 305 maintained in cooperation with the DPI agent 360, the DPI module 340 selects another host to perform DPI on copied packets. Hosts 305 may be selected based upon the availability data and/or according to one or more load-balancing algorithms, such as round robin, weighted queue, etc. The packets are transmitted to the selected host 305 over the DPI tunnel 330 and a verdict of the DPI is received from the selected host 305 over the DPI tunnel 330.

In one embodiment the DPI tunnel 330 and the communication bus 320 are implemented on a single connection between hosts 305, e.g., the cluster servers network 220. Alternatively, the DPI tunnel 300 and the communication bus 320 are implemented on separate wired/wireless connections between hosts 305.

In one embodiment, the virtualized datacenter cluster 300 further includes a policy manager 335 to distribute and maintain one or more policies applied during DPI by the DPI modules 340. The policies are transmitted to the DPI agents 360 across the communication bus 320, which in turn transmit the policies to the DPI modules 340.

While the implementation of distributed DPI using DPI modules 340 and agents 360 is described in the context of a virtualized datacenter cluster 300, the DPI modules 340 and agents 360 may be implemented within cluster devices that do not implement virtual machines 345. In an additional embodiment, a client 205 may implement distributed DPI in cooperation with another client 205 or one or more cluster servers 210. For example, a DPI module 340 within a client 205 may forward copied packets to a DPI module 340 within a cluster server 210 or within another client 205 and receive back a verdict of the DPI.

Figure 4:
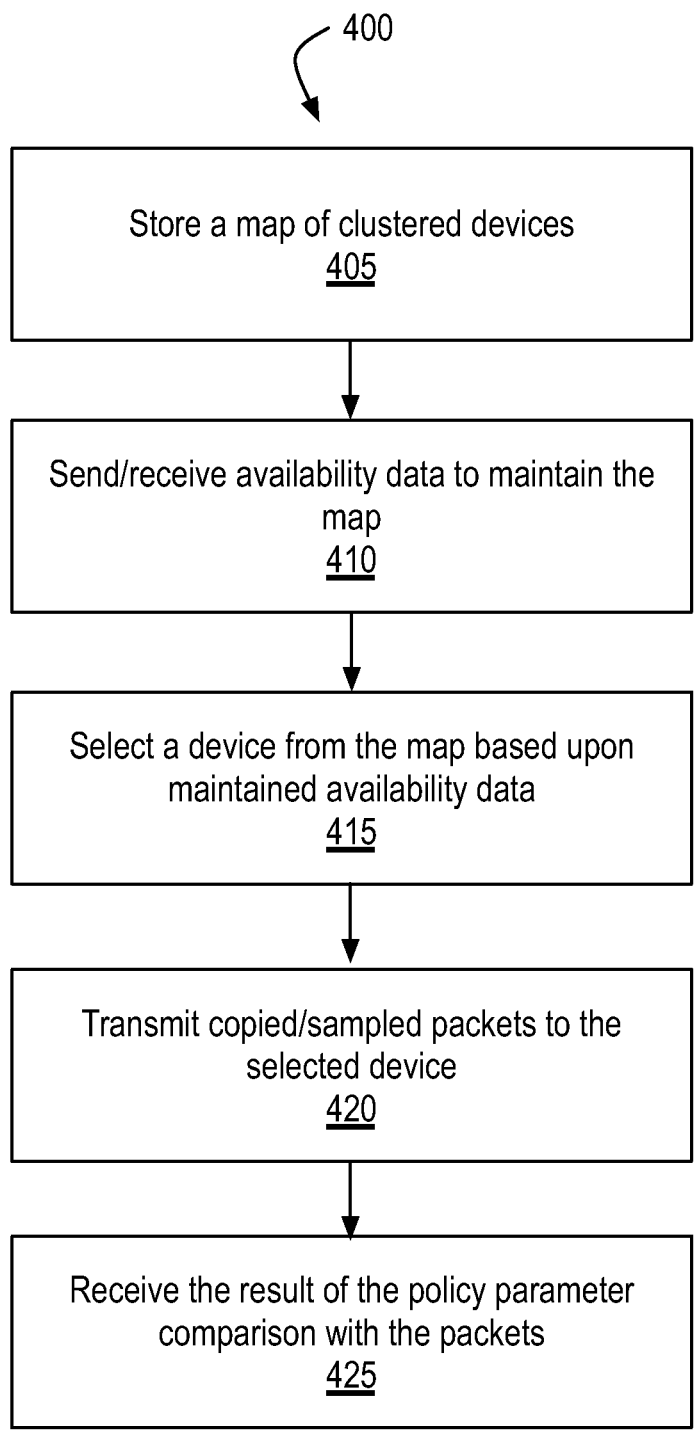
FIG. 4 is a flow chart illustrating an exemplary method of maintaining a map of devices within a datacenter cluster of devices and distributing deep packet inspection to one or more available devices based upon availability.

FIG. 4 is a flow chart illustrating an exemplary method 400 of maintaining a map of devices within a datacenter cluster of devices and distributing DPI to one or more available devices based upon availability. In one embodiment, the method 400 is performed, at least in part, as a part of the determination at block 120 in the method 100 described with reference to FIG. 1.

At block 405, an embodiment stores a map of clustered devices. For example, a DPI module 340 may create or receive and store a map of known devices within its cluster.

At block 410, an embodiment sends and/or receives availability data to maintain maps within the cluster. For example, the DPI agents 360 send and receive the availability data on behalf of the DPI modules 340. The DPI modules 340 use the availability data to maintain their respective stored maps.

At block 415, an embodiment selects a device from the map based upon the maintained availability data. For example, as described above, the DPI module 340 selects an available host 305 based upon the availability data and/or a load-balancing algorithm.

At block 420, an embodiment transmits copied packets to the selected device. For example, a first DPI module 340 transmits copied packets to a second DPI module 340 in the selected host 305 over the DPI tunnel 330.

At block 425, an embodiment receives the result of the selected host's policy comparison with the copied packets. Continuing with the example above, the first DPI module 340 receives the DPI verdict from the second DPI module 340 in the selected host 305 over the DPI tunnel 330.

Figure 5:
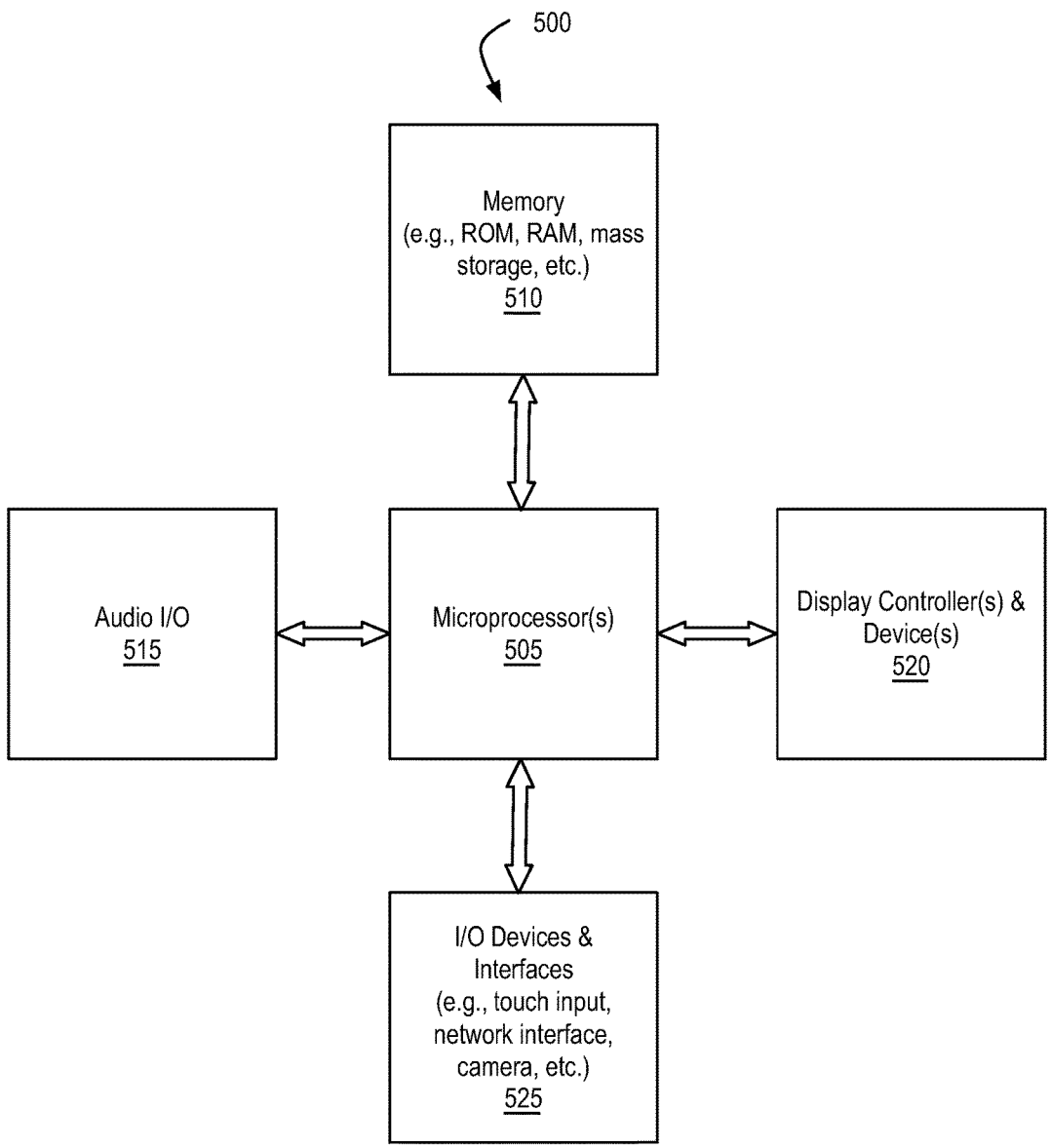
FIG. 5 illustrates, in block diagram form, an exemplary processing system to perform deep packet inspection or distributed deep packet inspection.

FIG. 5 illustrates, in block diagram form, an exemplary processing system 500 to perform DPI or distributed DPI. Data processing system 500 includes one or more microprocessors 505 and connected system components (e.g., multiple connected chips). Alternatively, the data processing system 500 is a system on a chip.

The data processing system 500 includes memory 510, which is coupled to the microprocessor(s) 505. The memory 510 may be used for storing data, metadata, and programs for execution by the microprocessor(s) 505. The memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 510 may be internal or distributed memory.

The data processing system 500 also includes an audio input/output subsystem 515 which may include a microphone and/or a speaker for, for example, playing back music or other audio, receiving voice instructions to be executed by the microprocessor(s) 505, playing audio notifications, etc. A display controller and display device 520 provides a visual user interface for the user.

The data processing system 500 also includes one or more input or output ("I/O") devices and interfaces 525, which are provided to allow a user to provide input to, receive output from, and otherwise transfer data to and from the system. These I/O devices 525 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 500.

The I/O devices and interfaces 525 may also include a port, connector for a dock, or a connector for a USB interface, FireWire, Thunderbolt, Ethernet, Fibre Channel, etc. to connect the system 500 with another device, external component, or a network. Exemplary I/O devices and interfaces 525 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect the data processing system 500 with another device, external component, or a network and receive stored instructions, data, tokens, etc.

It will be appreciated that one or more buses, may be used to interconnect the various components shown in FIG. 5.

The data processing system 500 is an exemplary representation of one or more of the clients 205, cluster servers 210, or hosts 305 described above. The data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 500 may be a network computer, server, or an embedded processing device within another device or consumer electronic product. As used herein, the terms computer, device, system, processing system, processing device, and "apparatus comprising a processing device" may be used interchangeably with the data processing system 500 and include the above-listed exemplary embodiments.

It will be appreciated that additional components, not shown, may also be part of the system 500, and, in certain embodiments, fewer components than that shown in FIG. 5 may also be used in a data processing system 500. It will be apparent from this description that aspects of the inventions may be embodied, at least in part, in software. That is, the computer-implemented methods 100 and 400 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via a network interface device 525. In various embodiments, hardwired circuitry may be used in combination with the software instructions to implement the present embodiments. Thus, the techniques are not limited to any specific combination of hardware circuitry and software, or to any particular source for the instructions executed by the data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions.

Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
receiving, at a first host computer, a plurality of packets of a flow of packets from a source to a destination;
selecting a second host computer based upon computational resource availability of host computers within a cluster of host computers;
transmitting a copy of the plurality of packets to the selected second host computer;
receiving, at the first host computer from the second host computer, a result of a comparison of content of the copy of the plurality of packets to a policy while or after one or more of the plurality of packets are forwarded to the destination;
determining, based upon the received result, that the flow of packets triggers a policy response; and
performing the policy response in response to the determination on a set of packets from the plurality of packets that have not reached the destination, wherein the policy response has an impact on the flow of packets to the destination.

2. The computer-implemented method of claim 1, wherein the policy response includes resetting the flow of packets or diverting the flow of packets to a different destination.

3. The computer-implemented method of claim 1, wherein the source or the destination is a first virtual machine running on the first host computer.

4. The computer-implemented method of claim 1, further comprising:
copying one or more of the plurality of received packets at a plurality of configurable sampling rates to generate a plurality of samples, wherein the policy is compared against each of the plurality of samples.

5. The computer-implemented method of claim 4, wherein transmitting the copy of the plurality of packets to the second host computer includes transmitting one of the plurality of samples to the second host computer.

6. The computer-implemented method of claim 5, wherein receiving the result of a comparison includes receiving, from the second host computer, a result of a comparison of the transmitted sample to the policy.

7. The computer-implemented method of claim 1, wherein the source of the flow of packets is a first virtual machine running on the first host computer, and wherein packets from a second virtual machine within the first host computer are transmitted without being copied and compared against the policy.

8. A non-transitory computer-readable medium storing instructions, which when executed by a processing device, cause the processing device to perform method comprising:
   receiving, at a first host computer, a plurality of packets of a flow of packets from a source to a destination;
   selecting a second host computer based upon computational resource availability of host computers within a cluster of host computers;
   transmitting a copy of the plurality of packets to the selected second host computer;
   receiving, at the first host computer from the second host computer, a result of a comparison of content of the copy of the plurality of packets to a policy while or after one or more of the plurality of packets are forwarded to the destination;
   determining, based upon the received result, that the flow of packets triggers a policy response; and
   performing the policy response in response to the determination on a set of packets from the plurality of packets that have not reached the destination, wherein the policy response has an impact on the flow of packets to the destination.

9. The non-transitory computer-readable medium of claim 8, wherein the policy response includes resetting the flow of packets or diverting the flow of packets to a different destination.

10. The non-transitory computer-readable medium of claim 8, wherein the source or the destination is a first virtual machine running on the first host computer.

11. The non-transitory computer-readable medium of claim 8, the method further comprising:
   copying one or more of the plurality of received packets at a plurality of configurable sampling rates to generate a plurality of samples, wherein the policy is compared against each of the plurality of samples.

12. The non-transitory computer-readable medium of claim 11, wherein transmitting the copy of the plurality of packets to the second host computer includes transmitting one of the plurality of samples to the second host computer.

13. The non-transitory computer-readable medium of claim 12, wherein receiving the result of a comparison includes receiving, from the second host computer, a result of a comparison of the transmitted sample to the policy.

14. The non-transitory computer-readable medium of claim 8, wherein the source of the flow of packets is a first virtual machine running on the first host computer, and wherein packets from a second virtual machine within the first host computer are transmitted without being copied and compared against the policy.

15. A first host computer comprising:
   a processing device; and
   a memory coupled to the processing device, the memory storing instructions, which when executed by the processing device, cause the first host computer to:
      receive a plurality of packets of a flow of packets from a source to a destination;
      select a second host computer based upon computational resource availability of host computers within a cluster of host computers;
      transmit a copy of the a plurality of packets to the selected second host computer;
      receive, at the first host computer from the second host computer, a result of a comparison of content of the copy of the a plurality of packets to a policy while or after one or more of the plurality of packets are forwarded to the destination;
      determine, based upon the received result, that the flow of packets triggers a policy response; and
      perform the policy response in response to the determination on a set of packets from the plurality of packets that have not reached the destination, wherein the policy response has an impact on the flow of packets to the destination.

16. The first host computer of claim 15, wherein the source or the destination is a first virtual machine running on the first host computer.

17. The first host computer of claim 15, wherein execution of the instructions further cause the first host computer to:
   copy one or more of the plurality of received packets at a plurality of configurable sampling rates to generate a plurality of samples, wherein the policy is compared against each of the plurality of samples.

18. The first host computer of claim 17, wherein transmitting the copy of the plurality of packets to the second host computer includes transmitting one of the plurality of samples to the second host computer.

19. The first host computer of claim 18, wherein receiving the result of a comparison includes receiving, from the second host computer, a result of a comparison of the transmitted sample to the policy.

20. The first host computer of claim 15, wherein the source of the flow of packets is a first virtual machine, and wherein packets from a second virtual machine within the first host computer are transmitted without being copied and compared against the policy.

* * * * *